United States Patent [19]

Thayer

[11] Patent Number: 4,591,097
[45] Date of Patent: May 27, 1986

[54] THRUST REVERSER/EXHAUST NOZZLE ASSEMBLY FOR A GAS TURBINE ENGINE

[75] Inventor: Edward B. Thayer, Jupiter, Fla.

[73] Assignee: The United States of America as represented by the Secretary of the Air Force, Washington, D.C.

[21] Appl. No.: 611,041

[22] Filed: May 16, 1984

[51] Int. Cl.⁴ .............................................. B64C 15/00
[52] U.S. Cl. ................................. 239/265.29; 60/230; 239/265.41
[58] Field of Search ...................... 239/265.19, 265.25, 239/265.27, 265.29, 265.31, 265.33, 265.37, 265.39, 265.41; 60/228–230, 232

[56] References Cited

U.S. PATENT DOCUMENTS

| | | | |
|---|---|---|---|
| 3,059,426 | 10/1962 | Laucher et al. | 239/265.31 |
| 3,172,256 | 3/1965 | Kerry et al. | 60/229 |
| 3,266,734 | 8/1966 | Gahagan et al. | 239/265.29 |
| 3,601,992 | 8/1970 | Maison | 60/226 |
| 3,655,133 | 4/1972 | Medaivar et al. | 239/265.31 |
| 3,703,258 | 11/1972 | Wildner | 239/265.29 |
| 3,730,436 | 5/1973 | Madden et al. | 239/265.39 |
| 3,739,582 | 6/1973 | Maison | 60/226 A |
| 3,973,731 | 8/1976 | Thayer | 239/265.29 X |
| 4,375,276 | 3/1983 | Konarski | 239/265.29 |
| 4,382,551 | 5/1983 | Thayer | 239/265.29 |
| 4,502,637 | 3/1985 | Nightingale | 239/265.25 X |

*Primary Examiner*—Joseph F. Peters, Jr.
*Assistant Examiner*—Daniel R. Edelbrock
*Attorney, Agent, or Firm*—Donald J. Singer; John R. Flanagan; Bobby D. Scearce

[57] ABSTRACT

An improved thrust reverser/exhaust nozzle assembly has a plurality of blocker devices located in the divergent section of the exhaust nozzle and a plurality of deflector devices located in the convergent section of the nozzle. The blocker and deflector devices are linked together such that they move simultaneously and maintain a substantially constant engine flowrate during transitions of the engine between forward and reverse thrust conditions.

6 Claims, 6 Drawing Figures

THRUST REVERSER/EXHAUST NOZZLE ASSEMBLY FOR A GAS TURBINE ENGINE

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to thrust reversing in gas turbine engines and, more particularly, is concerned with an improved reversing system in which blocker devices located in the divergent section of the exhaust nozzle are linked with deflector devices located in its convergent section.

2. Description of the Prior Art

Gas turbine engines incorporated in military and commercial aircraft often include variable area exhaust nozzles as well as thrust reversing systems. Typically, a variable exhaust nozzle is movable between a closed position wherein it defines a minimum exhaust are a for cruise and other low power modes and an open position wherein it defines a maximum exhaust area for takeoff and other high power modes. A thrust reversing system ordinarily is deployed during approach and landing when the exhaust nozzle is in its closed, minimum area position.

One recent thrust reversing system is disclosed and illustrated in U.S. Pat. No. 4,382,551. It is particularly advantageous when used with gas turbine engines requiring variable area convergent/divergent exhaust nozzles. It employs reverser doors which are part of and carried by the nozzle flaps of the already existing variable area exhaust nozzle. Elimination of the need for separate structures to carry the reverser doors results in a significant weight savings and drag reduction.

Although the thrust reversing system of the aforementioned patent has satisfactorily met its intended objectives, it and other axisymmetric reversing systems occasionally incur sudden throat shifts due to uneven engine flowrates during transition between forward and reverse thrust conditions. Consequently, a need exists for improvement of reversing systems which avoid problems associated with uneven engine flowrates without creating added weight and drag problems.

SUMMARY OF THE INVENTION

The present invention provides a thrust reversing system designed to meet the aforementioned needs. In a variable area convergent/divergent exhaust nozzle, the thrust reversing system of the present invention provides blocker devices in the divergent section of the nozzle and deflector devices in the convergent section. The blocker devices and deflector devices are linked such that they move together to maintain a substantially constant engine flowrate during transitions between forward and reverse thrust conditions. By installing the blocker devices in the divergent seals immediately downstream of the nozzle throat, flow blockage occurs at the smallest cross-sectional area in the nozzle flowpath. This minimizes both the size of the blockers and the actuator load required to deploy them into the gas stream.

Accordingly, the present invention is directed to an improved reverser/exhaust nozzle assembly for a gas turbine engine having a central axis. The improved nozzle assembly comprises: (a) a gas turbine engine exhaust case structure; (b) divergent nozzle means mounted on the case structure for movement between a closed position wherein a first downstream exhaust gas flow path having a minimum exit area is defined and an open position wherein a second downstream exhaust gas flow path having a maximum exit area is defined; (c) convergent nozzle means axially displaced upstream of said divergent nozzle means and mounted on the case structure for movement between contracted and expanded positions; (d) gas flow blocker means mounted on the divergent nozzle means for movement between a deployed position wherein gas flow is redirected from the first donwstream path outwardly and into an upstream path and a stored position wherein downstream gas flow through the divergent nozzle means is unobstructed by the blocker means; (e) gas flow deflector means axially displaced upstream of the blocker means and mounted on the convergent nozzle means for movement between a raised position wherein gas flow in the upstream path is allowed to exit the case structure through the convergent nozzle means and a lowered position wherein downstream gas flow through the convergent nozzle means is unobstructed by the deflector means; and (f) means linking the gas flow blocker means and the gas flow deflector means together such that they will move concurrently between their respective deployed and stowed positions and raised and lowered positions.

DETAILED DESCRIPTION OF THE INVENTION

Figure 1:
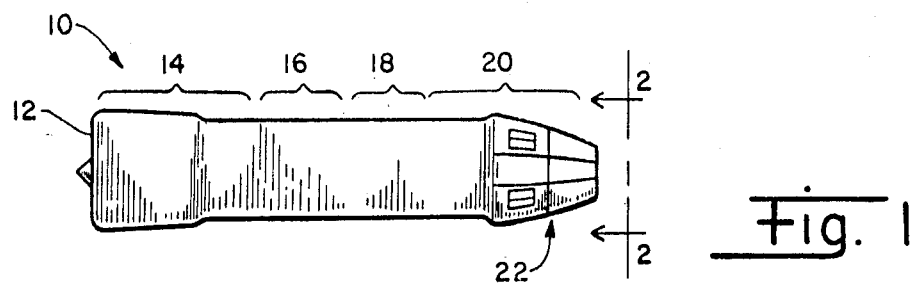
FIG. 1 is a schematic side elevational view of a gas turbine engine incorporating the improved thrust reversing system of the present invention.

Referring now to the drawings, and more particularly to FIG. 1, there is shown a gas turbine engine, generally designated 10, which incorporates the present invention. The engine 10 has an air inlet 12, a compressor section 14, a combustion section 16, a turbine section 18, and an exhaust section 20. The exhaust section 20 incorporates the improved reverser/exhaust nozzle assembly, generally designated 22, of the present invention. In its general mode of operation, air enters the engine 10 through air inlet 12, is compressed as it passes through the compressor section 14, is heated in a power generating function in the combustion section 16, then passes through the turbine section 18 in a power extraction function, and finally, is exhausted in jet exhaust fashion through the improved nozzle assembly 22 in the exhaust section 20.

Figure 3:
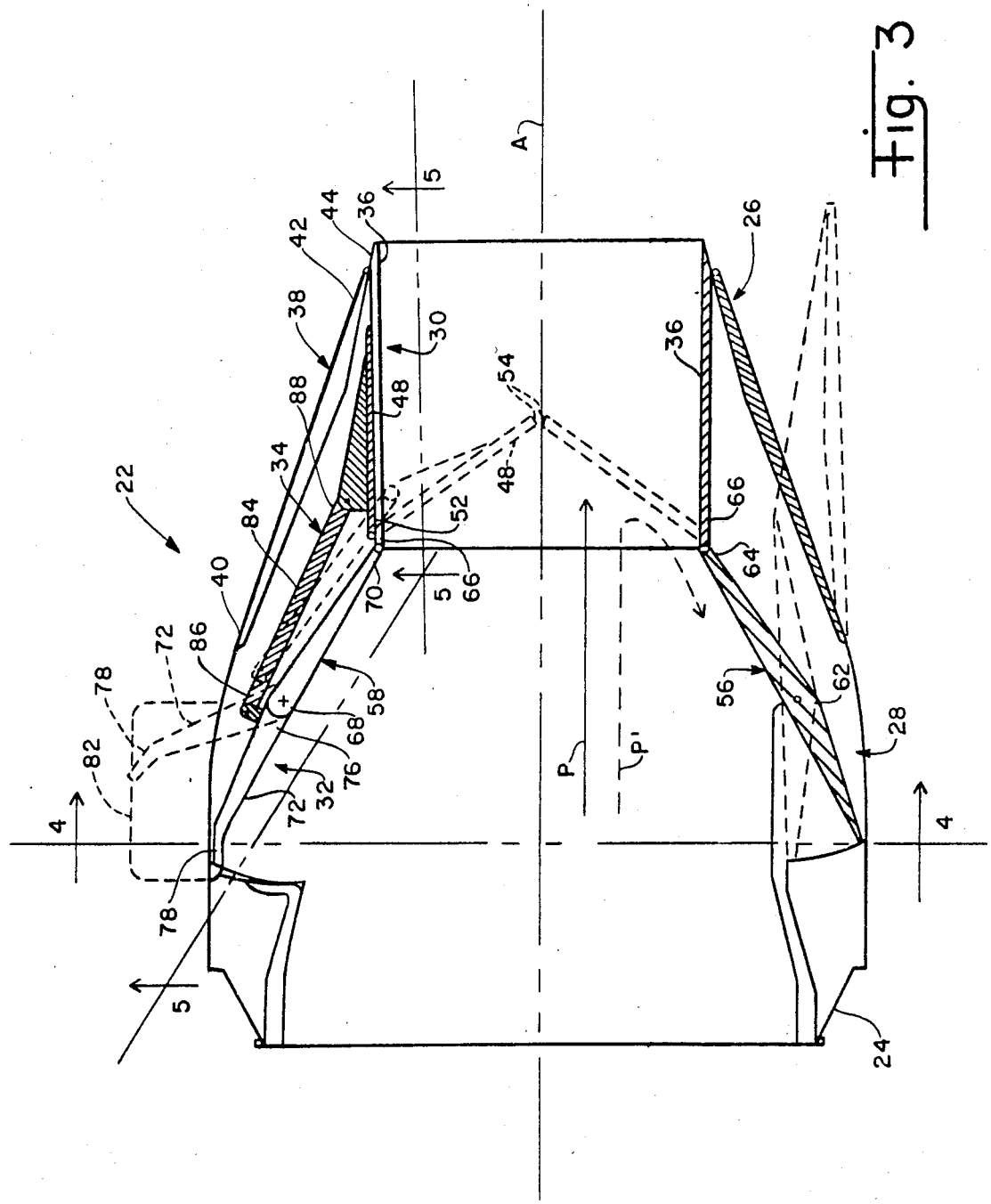
FIG. 3 is a cross-sectional view of the improved thrust reversing system taken along line 3—3 of FIG. 2.

As seen more clearly in FIG. 3, the improved nozzle assembly 22 includes case structure 24 of the engine exhaust section 20, divergent nozzle means 26 mounted on the case structure 24, convergent nozzle means 28 axially displaced upstream of the divergent nozzle means 26 and mounted on the case structure 24, gas flow blocker means 30 mounted on the divergent nozzle means 26, gas flow deflector means 32 axially displaced upstream of the blocker means 30 and mounted on the convergent nozzle means 28, and linking means 34 interconnecting the blocker means 30 and deflector means 32 together. The gas flow blocker and deflector means 30, 32 are together movable for reversing the direction of thrust produced by the engine 10.

Figure 2:
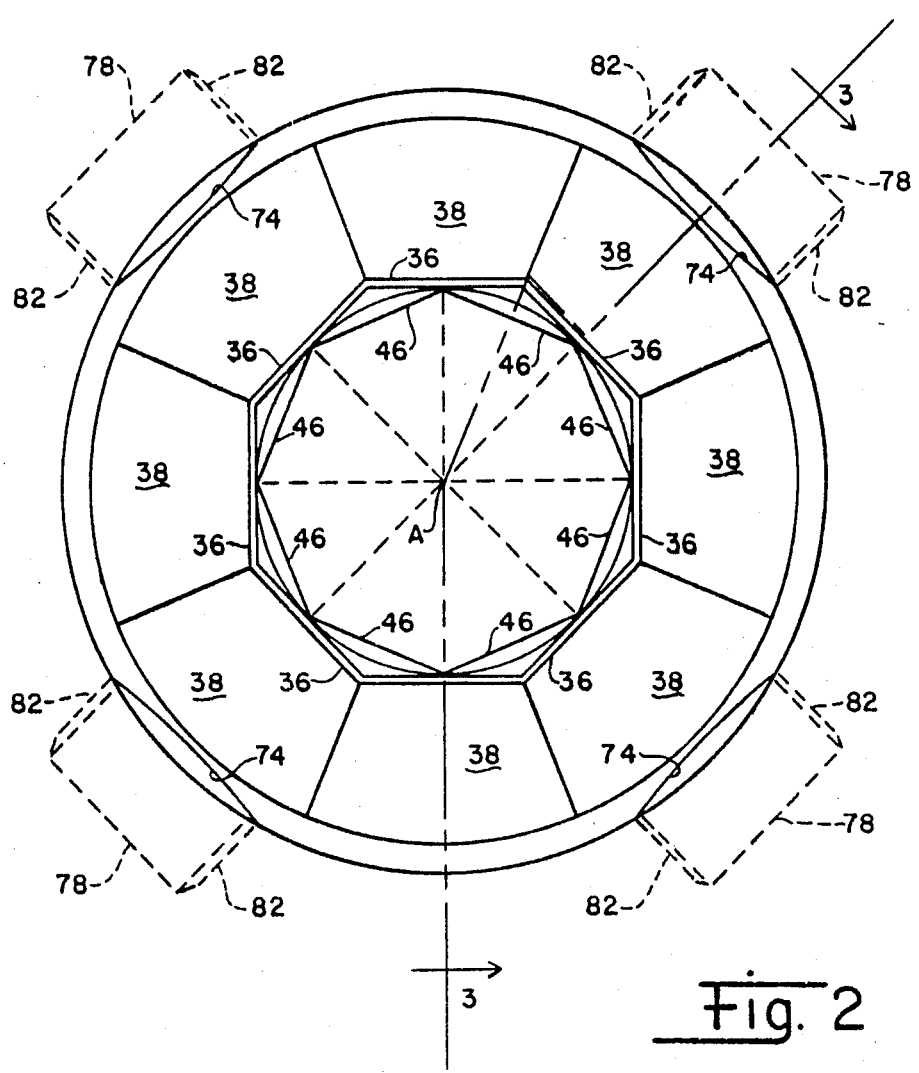
FIG. 2 is an enlarged view of the turbine engine as seen along line 2—2 of FIG. 1 at the exhaust nozzle of the engine.

The divergent nozzle means 26 includes a plurality of divergent flaps 36, such as can be readily seen in the rear end view of the turbine engine 10 in FIG. 2. Each flap 36 extends in a general fore-and-aft direction along, and circumferentially disposed about a central axis A of the engine 10. The divergent nozzle means 36 also includes a plurality of external flaps 38 disposed outwardly of the plurality of divergent flaps 36. The external flaps 38, as in the case of the divergent flaps 36, also extend along and are circumferentially disposed about the engine axis A. Each external flap 38 has an upstream end 40 pivotally connected to the case structure 24 and a downstream end 42 pivotally connected to a downstream end 44 of one of the divergent flaps 36. The divergent nozzle means 36 further includes a plurality of divergent seals 46 associated with the divergent flaps 36, extending along and circumferentially disposed about the engine axis A. In the preferred embodiment, there are eight flaps 36, 38 and eight seals 46. Each of the divergent flaps 36 can be moved by any suitable means (not shown), such as disclosed in U.S. Pat. No. 3,730,436 to Madden et al, which is incorporated herein by reference, between a closed position, shown in solid line form in FIG. 3, wherein a first downstream exhaust gas flow path having a minimum exit area is defined and an open position, shown in dashed line form in FIG. 3, wherein a second downstream exhaust gas flowpath having a maximum exit area is defined. Concurrently with the movement of the divergent flaps 36, each of the external flaps 38 assumes the respective solid line and dashed line positions shown in FIG. 3.

Figure 6:
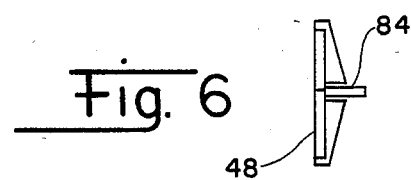
FIG. 6 is a fragmentary end view of the blocker device as seen along line 6—6 of FIG. 5.
Figure 5:
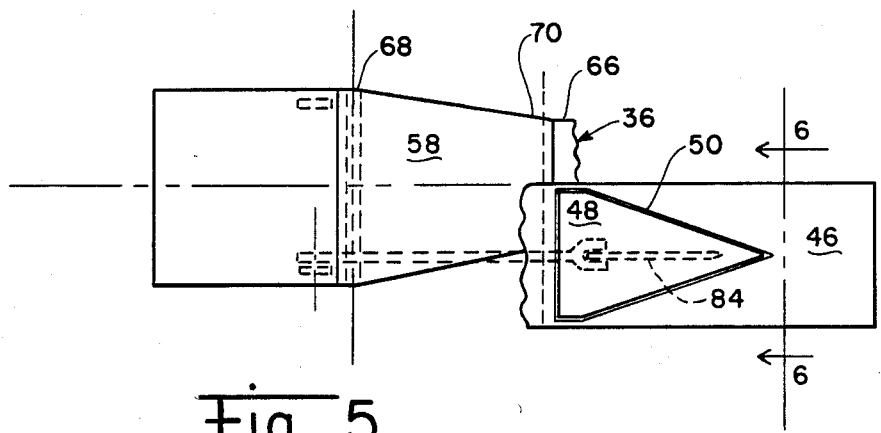
FIG. 5 is a fragmentary plan view taken along line 5—5 of FIG. 3, showing the link between the deflector device and blocker device.

The gas flow blocker means 30 includes a plurality of triangular-shaped blocker devices 48, each of which is associated with a cutout 50 in each of the divergent seals 46, as seen in FIG. 5. In the preferred embodiment, there are eight blocker devices 48 matched with the eight seals 46. Each blocker device 48 is pivotally mounted at its upstream end 52 to one of the divergent seal 46 near its upstream end. The blocker device 48 is movable between a deployed position, shown in dashed line form in FIG. 3 and a stowed position, shown in solid line form in FIG. 3. In the deployed position, all of the devices 48 extend through respective seal cutouts 50 and their downstream ends 54 meet at the central axis A of the engine 10 and obstruct the donwstream gas flow path P, redirecting it instead outwardly and into an upstream path P'. In the stowed position, the downstream gas flow path P is unobstructed by the blocker device 48, since the devices fit within and close the respective ones of the cutouts 50 in the divergent seals 46, as shown in FIG. 6.

Figure 4:
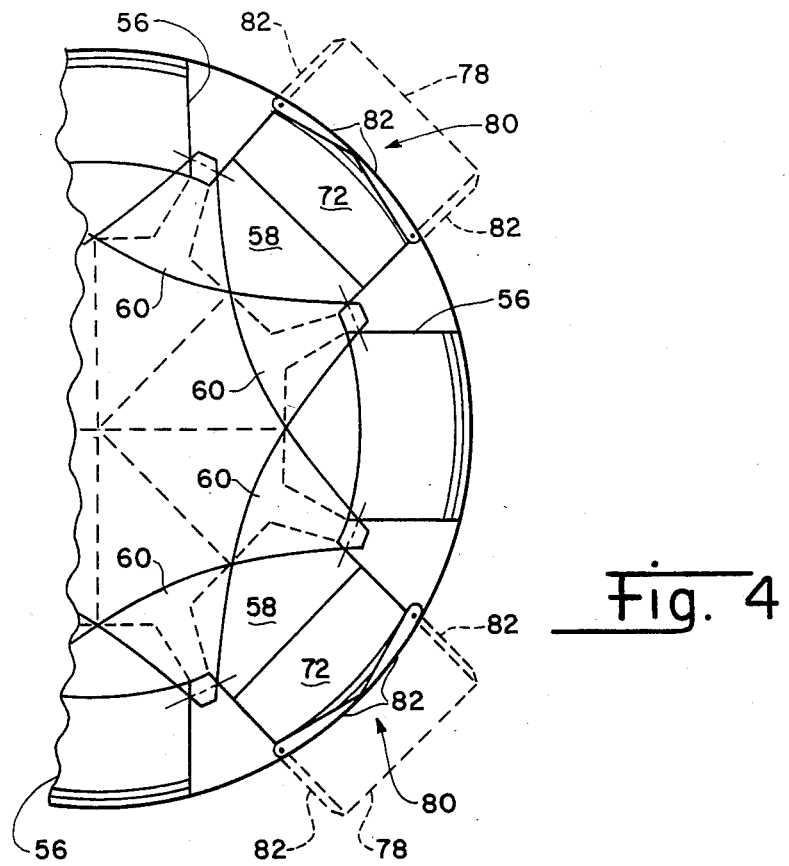
FIG. 4 is a fragmentary cross-sectional view taken along line 4—4 of FIG. 3.

As seen in FIGS. 3 and 4, the convergent nozzle means 28 includes a plurality of one-piece convergent flaps 56 disposed in alternating relationship with a plurality of articulated convergent flaps 58. Also, interposed between each of the two types of convergent flaps 56, 58 are convergent seals 60. In the preferred embodiment, there are four one-piece convergent flaps 56, four articulated convergent flaps 58 and eight convergent seals 60. Being axially displaced upstream of the divergent flaps 36, and like flaps 36, the convergent flaps 56, 58 extend along the engine axis A and are circumferentially spaced apart from one another and disposed about the engine axis. Flaps 56, 58 also are disposed in alternating relationship with one another and with the convergent seals 60. The one-piece convergent flaps 56 are pivotally mounted at their midsections 62 to the case structure 24 and at their donwstream ends 64 to the upstream ends 66 of every other one of the divergent flaps 36. The articulated convergent flaps 58 are pivotally mounted at their upstream ends 68 to the case structure 24 and at their downstream ends 70 to the upstream ends 66 of the remaining every other one of the divergent flaps 36.

As each of the divergent flaps 36 are moved between its closed (solid line) and open (dashed line) positions depicted in FIG. 3, the one of the convergent flaps 56, 58 pivotally connected thereto is moved between contracted (solid line) and expanded (dashed line) positions, as also seen in FIG. 3, with respect to the one-piece convergent flap 56.

The gas flow deflector means 32 includes a plurality of deflector devices 72, each of which is associated with one of the articulated convergent flaps 58 and one of a plurality of ports 74 defined in the case structures 24 outwardly of the device 72. In the preferred embodiment, there are four deflector devices 72 corresponding in number to the four articulated convergent flaps 58 and four ports 74. Like the articulated convergent flaps 58 with which they are aligned upstream from, the deflector devices 72 extend along the engine axis A and are circumferentially spaced apart from one another and disposed in alternating relationship with the one-piece convergent flaps 56 about the engine axis A. Each deflector device 72 at its downstream end 76 is pivotally mounted to the case structure 24 coaxially with the upstream end 68 of the corresponding end of the articulated convergent flaps 58. The other, upstream end 78 of each deflector device 72 is free and movable along an arcuated path when the device 72 is pivotally moved between raised (dashed line) and lowered (solid line) positions shown in FIG. 3.

As mentioned above, the case structure 24 includes a plurality of ports 74 circumferentially spaced apart from one another and disposed about the engine axis A so as to overlay the respective deflector devices 72. Associated with each of the ports 74 is closure means 80 in the form of a pair of fairing doors 82 pivotally mounted to the case structure 24 at opposite sides of the respective port 74. The doors 82 are normally disposed in a folded (solid line) position, as seen in FIG. 4, closing the port 74 when the deflector device 72 is disposed in its lowered (solid line) position, as seen in FIG. 3. Upon being engaged by free end 78 of the deflector devices 72 when pivoting to its raised (dashed line) position in FIG. 3, the doors 82 will pivot outwardly and away from one another and move to an extended (dashed line) position, as seen in FIGS. 2, 3 and 4.

Finally, as mentioned earlier, the blocker devices 48 and deflector devices 72 are linked together such that when the divergent and convergent flaps 36, 56, 58 are in their respective closed and expanded positions, movement of each blocker device 48 from its stowed (solid line) position to its deployed (dashed line) position, shown in FIG. 3, simultaneously moves each deflector device 72 from its lowered (solid line) position to its raised (dashed line) position as seen in FIG. 3 and causes a transition of the direction of thrust of the engine from forward to reverse. Specifically, the rearward gas flow path P is blocked and redirected by the blocker devices 48 along path P' and is made to exit the exhaust section 20 through open ports of 74. Now exhaust gas flow is in a generally forward direction or reverse to the normal, rearward direction of the exhaust gas flow path P. Accordingly, the engine is converted from a forward thrust condition to a reverse thrust condition. By such simultaneous movement of the blocker device 48 and deflector device 72, a substantially constant engine flowrate is maintained during transitions between forward and reverse thrust conditions. The means 34 for linking the devices 48, 72 together to cause simultaneous, coordinated pivotal movement of the devices together takes the form of a plurality of link bars 84. Each of the link bars 84 is pivotally connected at its upstream and downstream ends 86, 88 generally to the downstream end 76 of one deflector device 72 and the upstream end 52 of one blocker device 48. As seen in FIG. 6, each deflector device 72 is linked by a pair of link bars 84 to a pair of the blocker devices 48. Thus, in the preferred embodiment, there are eight link bars 84, and accordingly eight link bars 84 connected eight blocker devices 48 with four reversing deflector devices 72.

While an eight-flap system is disclosed as the preferred embodiment herein to provide four equally-spaced reverser ports, such as for a typical single-engine aircraft, it should be understood that a larger or smaller number of ports suitable for other aircraft applications can be achieved by increasing or decreasing the number of nozzle flap systems.

It is thought that the improved nozzle assembly of the present invention and many of its attendant advantages will be understood from the foregoing description and it be apparent that various changes may be made in the form, construction and arrangement of the parts thereof without departing from the spirit and scope of the invention or sacrificing all of its material advantages the form of hereinbefore described being merely a preferred or exemplary embodiment thereof.

Having thus described the invention, what is claimed is:

1. An improved thrust reverser/exhaust nozzle assembly for a gas turbine engine having a central axis, comprising:
   (a) a gas turbine engine exhaust case structure;
   (b) divergent nozzle means mounted on said case structure for movement between a closed position wherein a first downstream exhaust gas flow path having a minimum exit area is defined and an open position wherein a second downstream exhaust gas flow path having a maximum exit area is defined, said divergent nozzle means including a first plurality of divergent flaps and divergent seals extending along and circumferentially disposed about said engine axis, each of said divergent flaps and divergent seals having upstream and downstream ends, each of said divergent seals having a cutout therethrough;
   (c) convergent nozzle means axially displaced upstream of said divergent nozzle means and mounted on said case structure for movement between contracted and expanded positions, said convergent nozzle means including:
      a second plurality of one-piece convergent flaps extending along said engine axis and circumferentially spaced apart from one another about said engine axis, said one-piece flaps having respective upstream and downstream ends and being pivotally mounted at their respective midsections to said case structure and at their respective downstream ends to the respective upstream ends of a corresponding second plurality of said divergent flaps; and
      a third plurality of articulated convergent flaps extending along said engine axis and disposed about said engine axis in circumferentially spaced apart relationship to one another and alternately with said one-piece convergent flaps, said articulated flaps having respective upstream and downstream ends and being pivotally mounted at their respective upstream ends to said case structure and at their respective downstream ends to the respective upstream ends of a corresponding third plurality of said divergent flaps;
   (d) gas flow blocker means mounted on said divergent nozzle means for movement between a deployed position wherein gas flow is redirected from said first downstream path outwardly and into an upstream path and a stowed position wherein downstream gas flow through said divergent nozzle means is unobstructed by said blocker means, said gas flow blocker means including a plurality of blocker devices, each blocker device having an upstream and downstream end and being pivotally mounted at its upstream end to one of said divergent seals adjacent the upstream end thereof, said blocker device fitting within and closing said cutout of said one divergent seals when disposed in said stowed position and extending through said cutout and coacting with blocker devices of adjacent seals when disposed in said deployed position to substantially obstruct and prevent downstream gas flow through said divergent nozzle means;
   (e) gas flow deflector means axially displaced upstream of said blocker means and mounted on said convergent nozzle means for movement between a raised position wherein gas flow in said upstream path is allowed to exit said case structure through said convergent nozzle means and thereby reverse the direction of engine thrust and a lowered position wherein downstream gas flow through said convergent nozzle means is unobstructed by said deflector means; and
   (f) means linking said gas flow blocker means and said gas flow deflector means together such that they will move concurrently between their respective deployed and stowed positions and raised and lowered positions.

2. The nozzle assembly as recited in claim 1, wherein said gas flow deflector means includes:
   a plurality of deflector devices extending along said engine axis and circumferentially spaced apart from one another and disposed in alternating relationship with said one-piece flaps about said engine axis, said deflector devices each having upstream and downstream ends and being aligned with, and disposed upstream from, said each articulated convergent flap, said each deflector device at its downstream end being pivotally mounted to said case structure coaxially with said upstream end of a corresponding one of said articulated convergent flaps and at its upstream end being free and movable in an arcuate path when the device is moved between said raised and lowered positions.

3. The nozzle assembly as recited in claim 2, wherein: said case structure includes a plurality of ports defined therein and circumferentially spaced apart from one another and disposed about said engine axis and overlying said deflector devices; and said nozzle assembly further comprises closure means movably mounted to said case structure at each said port, said closure means being disposed normally in a first position in which said port is closed and pivotable to a second position in which said port is opened upon being engaged by one of said deflector devices in pivoting from its lowered to raised position.

4. The nozzle assembly as recited in claim 3, wherein said closure means is in the form of a pair of doors pivotally mounted to said case structure at opposite sides of said each port for movement toward and away from each other in moving between said respective first and second positions.

5. The nozzle assembly as recited in claim 2, wherein said linking means includes a plurality of link bars, each bar having an upstream end pivotally connected to one of the deflector devices and a downstream end pivotally connected to one of said blocker devices.

6. The nozzle assembly as recited in claim 5, wherein each one deflector device is linked by a pair of said link bars to a pair of said blocker devices.

* * * * *